United States Patent [19]
Strawczynski et al.

[11] Patent Number: 6,006,189
[45] Date of Patent: Dec. 21, 1999

[54] METHOD AND APPARATUS FOR STORING AND FORWARDING VOICE SIGNALS

[75] Inventors: Leo Strawczynski, Ottawa; Bill (W.A.) Gage, Stittsville, both of Canada

[73] Assignee: Nortel Networks Corporation, Montreal, Canada

[21] Appl. No.: 08/948,418

[22] Filed: Oct. 10, 1997

[51] Int. Cl.[6] .................................................. G10L 3/00
[52] U.S. Cl. ........................................... 704/270; 704/201
[58] Field of Search ................................... 704/270, 500, 704/200, 201; 379/67, 88; 375/219

[56] References Cited

U.S. PATENT DOCUMENTS

| | | | |
|---|---|---|---|
| 5,134,647 | 7/1992 | Pugh et al. | 379/88 |
| 5,517,561 | 5/1996 | Redden | 379/142 |
| 5,666,350 | 9/1997 | Huang et al. | 370/435 |
| 5,675,629 | 10/1997 | Raffel | 379/58 |
| 5,694,456 | 12/1997 | Carter et al. | 379/67 |
| 5,696,699 | 12/1997 | Nair | 364/514 |
| 5,763,305 | 6/1998 | Pon et al. | 375/219 |

FOREIGN PATENT DOCUMENTS 9500704  12/1995  WIPO .............................. H04Q 7/30

*Primary Examiner*—Richemond Dorvil

[57] ABSTRACT

In recent years, the telecommunications industry has witnessed the proliferation of a variety of digital vocoders in order to meet bandwidth demands of different wireline and wireless communication systems. The rapid growth in the diversity of networks and the number of users of such networks is increasing the number of instances where two vocoders are placed in tandem to serve a single connection. Such arrangements of low bit-rate codecs can degrade the quality of the transmitted speech. To overcome this problem in the specific situation involving store-and-forward systems (e.g. voicemail), the invention provides a novel method and apparatus including a plurality of different vocoders that can be selectively invoked to process the voice signal so as to reduce signal degradation. Also, the apparatus has the capability to bypass the vocoder bank when exchanging data with a remote signal processor capable of accepting data frames in compressed format.

17 Claims, 10 Drawing Sheets

METHOD AND APPARATUS FOR STORING AND FORWARDING VOICE SIGNALS

FIELD OF THE INVENTION

This invention relates to a method and an apparatus for transmitting digitized voice signals, in a telecommunication environment in which the compression and decompression of voice signals is involved. More specifically, it relates to a method and an apparatus for improving the quality of an audio signal, which has been compressed or encoded with a digital signal processing technique, when the signal is stored or retrieved to or from a store-and-forward (e.g. voicemail) system in a telecommunication network.

BACKGROUND OF THE INVENTION

In recent years, the telecommunications industry has witnessed the proliferation of a variety of digital vocoders in order to meet bandwidth demands of different wireline and wireless communication systems. Vocoders are usually integrated in wireless telephones and base stations of the communication network or a link therefrom. They provide speech compression of a digitized voice signal as well as the reverse transformation. Typically, a voice signal is digitized through one of many quantization techniques. An example of this technique is Pulse Code Modulation (PCM). For the purposes of this description, we will refer to PCM as the input format for the vocoder. Thus a vocoder includes an encoder stage that will accept as input a digitized voice signal and that will output a compressed signal, a possible compression ratio being 8:1. As for the reverse transformation the vocoder is provided with a decoder stage that will accept the compressed speech signal and that will output a digitized signal, such as PCM samples.

The main advantage of compressing speech is that it uses less of the limited available channel bandwidth for transmission. In voice messaging applications, it also minimizes storage memory requirements thereby increasing the number of subscribers that can be served. The main disadvantage is loss of speech quality specially when speech is subjected to multiple instances of vocoders.

The rapid growth in the diversity of networks and the number of users of such networks is increasing the number of instances where two vocoders are placed in tandem to serve a single connection. An example of such a situation is when a wireless user records a message to a voice storage and forwarding device and a wireline terminal then retrieves the message. In such a case, a first encoder is used to compress the speech at the terminal of the wireless user. The compressed speech is transmitted to a base station serving the local wireless terminal where it is decompressed (converted to PCM format samples). The resulting PCM samples are routed to the voice storage and forwarding device where a second encoder is used to compress the input signal for storage in a database. If the person who has access to the voice storage and forwarding device retrieves the message from a wireline terminal, a speech decoder in the voice storage and forwarding device decompresses the stored compressed speech data into PCM format for transmission to the wireline terminal over the PSTN.

The situation is even more complex when the user uses a wireless terminal to retrieve, from a voice storage and forwarding device, a message that was recorded by a wireless terminal user. In such a situation, the compression and decompression of speech occurs three times: once for the wireless terminal/base station combination, a second time in storing and retrieving the message in the voice storage and forwarding device, and finally, a third time in the last base station/wireless terminal combination. Yet other expanding areas of concern are Internet telephony and corporate low bit-rate networks. Indeed, both these types of networks use vocoders as well.

In an attempt to eliminate the condition of vocoder tandeming, a method called "bypass" has been proposed in the past. The basic idea behind this approach is the provision of a digital signal processor including a vocoder and a bypass mechanism that is invoked when the incoming signal is in a format compatible with the vocoder. In use, the digital signal processor associated with the first base station that receives the RF signal from a first wireless terminal determines, through signaling and control, that an identical digital signal processor exists at the second base station associated with the wireless terminal at which the call is directed. The digital signal processor associated with the first base station, rather than converting the compressed speech signals into PCM samples, invokes the bypass mechanism and outputs the compressed speech in the transport network. The compressed speech signal, when arriving at the digital signal processor associated with the second base station is routed such as to bypass the local vocoder. Decompression of the signal occurs only at the second wireless terminal. The "bypass" approach is described in the international application serial number PCT/95CA/00704 dated Dec. 13, 1995. The contents of this disclosure are incorporated herein by reference.

However, the "bypass" solution described above was designed for the base station portion of the telecommunication network. This implies that it is useful only for the tandem situations in which a telecommunication link is established between two wireless users. Also, this solution is only valid for identical vocoders. With the diversity of vocoders quickly increasing, the bypass solution is only valid for a small portion of connections involving tandem vocoding.

Thus, there exists a need in the industry for devices capable of improving voice quality in other situations that involve vocoder tandeming such as in digital voice store-and forward systems.

SUMMARY OF THE INVENTION

The present invention provides a voice storage and forwarding device, for use in a communication network, in which the most suitable path for a voice signal is chosen during storage and retrieval of the signal, such that there is a reduction in signal degradation due to successive signal compression/decompression cycles. In a specific example of implementation, the voice storage and forwarding device provides a storage medium for the storage of voice messages issued from a subscriber terminal connected to the communication network during a message recording transaction. Upon retrieval of a voice message from the storage medium, the voice storage and forwarding device will select either of two data pathways for forwarding the digitized voice signal to the subscriber terminal, based on a characteristic of the termination point at which the subscriber terminal is connected. If the first data pathway is selected, the voice signal is forwarded in compressed form from the storage medium to the subscriber terminal (bypass mode). If the second data pathway is selected, the compressed voice signal is passed from the storage medium to an audio signal decoder for decompression, the voice signal then being forwarded in PCM form to the subscriber terminal (non-bypass mode). Under this example of implementation, the voice storage and forwarding device is implemented as a distributed system where the storage medium is separated from the vocoder (which includes an audio signal encoder and an audio signal decoder), the latter being co-located with a gateway mobile switching center. The gateway mobile switching center forms a gateway between the PSTN network and a cellular network, and includes a call routing controller whose responsibility it is to determine how the data will be transmitted through the network during a message retrieval transaction. The storage medium is coupled to a data packet routing controller that is in essence a switching mechanism directing data packets of an encoded audio signal from the storage medium toward a selected pathway through the network for delivery to a subscriber terminal. The call routing controller regulates the operation of the data packet routing controller by using out-of-band signaling.

Throughout this specification, the term "wireless terminal" is intended to include both mobile terminals and fixed wireless terminals. The term "wireless terminal" is part of a larger family of terminals that we call "speech compression terminals". These terminals usually include vocoders that are capable of converting speech from a digitized format to a compressed format and vice versa. Other examples of these terminals are those used for Internet telecommunications, Integrated Services Digital Network (ISDN) terminals, etc. This disclosure is therefore meant to include all terminals capable of converting speech from a digitized format to a compressed format and vice versa.

Throughout this specification, the expression "data frame" will refer to a group of bits organized in a certain structure or frame that conveys some information. Typically, a data frame when representing a segment of audio signal in compressed form will include a coefficients segment and an excitation segment. The data frame may also include additional elements that may be necessary for the intended application.

Throughout this specification, the expressions "first format", "second format", etc. when used to describe the audio signal in compressed form in the format of a given vocoder, refers to signals in compressed form that are, generally speaking, not compatible with each other, although they may share a common basic structure. For example, such signals may be divided into a coefficient segment and an excitation segment. Thus, a vocoder capable of converting a signal under the first format will not, generally speaking, be capable of processing a signal expressed under any other format than the first format.

Throughout this specification, the term "coefficient segment" is intended to refer to any set of coefficients that uniquely defines a filter function which models the human vocal tract. It also refers to any type of information format from which the coefficients may indirectly be extracted. In conventional vocoders, several different types of coefficients are known, including reflection coefficients, arcsines of the reflection coefficients, line spectrum pairs, log area ratios, among others. These different types of coefficients are usually related by mathematical transformations and have different properties that suit them to different applications. Thus, the term "coefficient segment" is intended to encompass any of these types of coefficients.

Throughout this specification, the term "excitation segment" refers to information that needs to be combined with the coefficients segment in order to provide a complete representation of the audio signal. It also refers to any type of information format from which the excitation may indirectly be extracted. The excitation segment complements the coefficients segment when synthesizing the signal to obtain a signal in a non-compressed form such as in PCM sample representations. Such excitation segment may include parametric information describing the periodicity of the speech signal, an excitation signal as computed by the encoder of a vocoder, speech framing control information to ensure synchronous framing in the decoder associated with the remote vocoder, pitch periods, pitch lags, gains and relative gains, among others.

The present invention also encompasses a method for storing and forwarding voice data that allows to reduce signal degradations as a result of successive signal compression/decompression cycles, particularly when non-compatible vocoders are used to effect the compression/decompression cycles.

The present invention further encompasses a communication system with voice storage and forwarding capability, designed to reduce signal degradations as a result of successive signal compression/decompression cycles, particularly when noncompatible vocoders are used to effect the compression/decompression cycles.

Other aspects and features of the present invention will become apparent to those ordinarily skilled in the art upon review of the following description of specific embodiments of the invention in conjunction with the accompanying figures.

DESCRIPTION OF A PREFERRED EMBODIMENT

Figure 1:
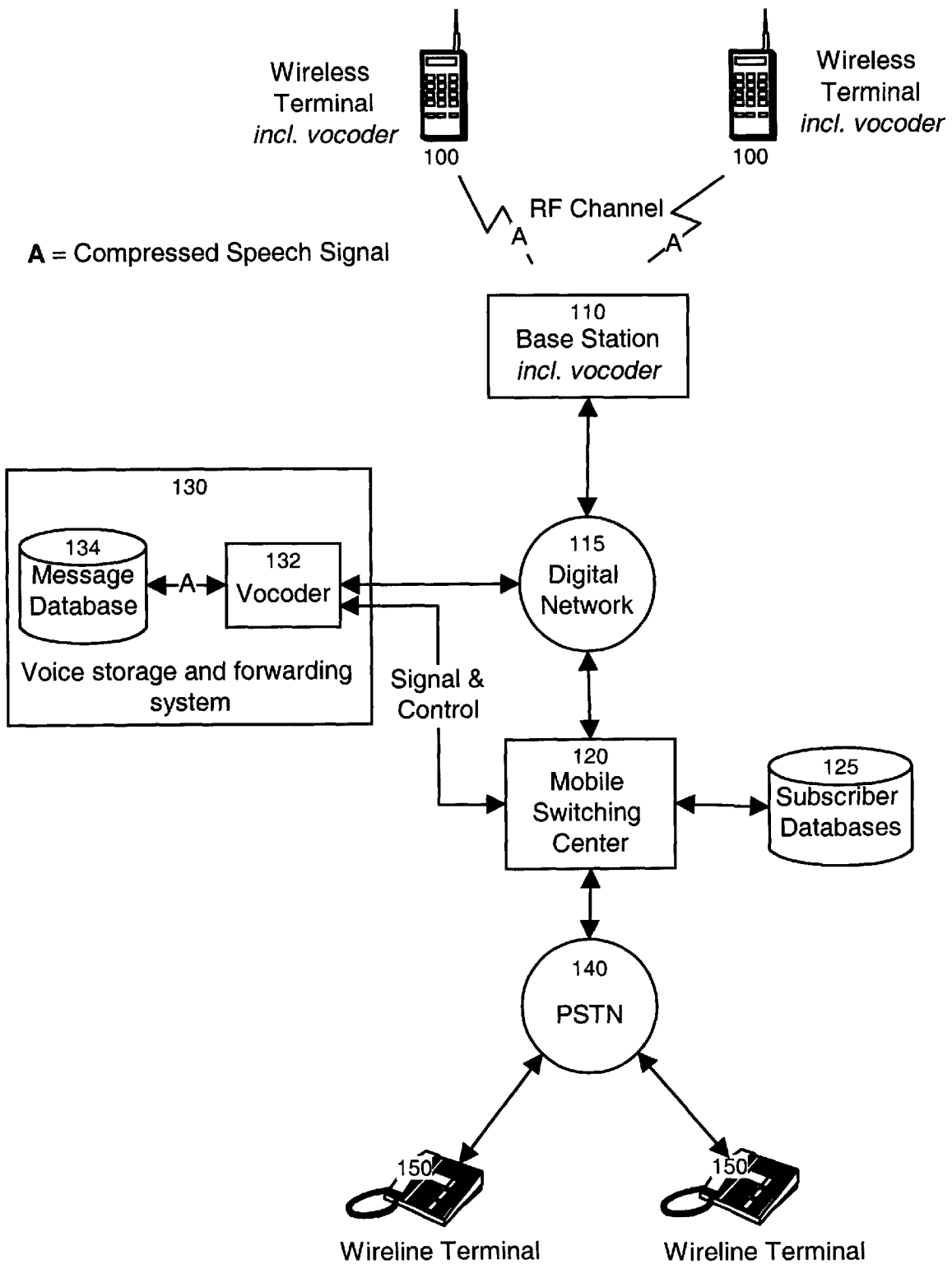
FIG. 1 is a block diagram depicting a partial view of a telecommunication network.

FIG. 1 is a block diagram depicting a partial view of one example of a telecommunication network. It is not the only network to which this invention applies and therefore should not be considered as limiting the scope of the invention. An example of the storage and retrieval of a voice message in a voice storage and forwarding device follows. A wireless user initiates a call and he wishes to leave a message in the voice storage and forwarding device of the called party. Firstly, the proper signaling and control is established and the Mobile Switching Center 120 will send the necessary instructions through the Digital Network 115 switches to establish a pathway in order to get the speech signal to the voice storage and forwarding device 130. Secondly, speech is compressed (encoded) by a vocoder located in wireless terminal 100 and sent via a wireless link (RF channel) to a base station 110 where it is decoded into PCM samples by the decoder of a second vocoder. The signal is then directed, through various switches in the digital network of the telecommunication network 115 to the voice storage and forwarding device 130. The speech signal will then be encoded by the vocoder 132 of the voice storage and forwarding device and stored in a message database 134 according to the database digital format.

When the voice storage and forwarding device user wants to retrieve his message the following occurs. (Note that for this example, the user will retrieve the message from a wireline terminal 150.) Again, signaling and control first establishes the proper connection for the speech signal to travel. Then, the voice storage and forwarding device message database 134 is accessed and the user requests to retrieve his message. The speech signal leaves the message database in a compressed form and is converted to PCM by vocoder 132. The speech signal then travels through the Digital Network 115, the mobile switching center 120, the Public Switched Telephone Network (PSTN) 140 and finally reaches the wireline terminal 150 after conversion to analog format. In such a scenario, speech is compressed and decompressed twice.

Another example of tandem vocoding (compress/decompress twice) is a situation where a wireless terminal is communicating with another wireless terminal 100.

Yet another stage of vocoding may be added to the first example described above. Indeed, a third stage of vocoding will be present when the voice storage and forwarding device user is retrieving his message from a wireless terminal. In this case, signaling and control first establishes the proper connection for the speech signal to travel. Then, the voice storage and forwarding device message database 134 is accessed and the user requests to retrieve his message. The speech signal leaves the message database 134 in a compressed form and is converted to PCM by vocoder 132. The speech signal then travels through the Digital Network 115, and is sent to the base station 110 where it will be converted to a compressed format. Finally, the speech signal travels over the RF channel to reach the wireless terminal 100 where it will be converted a final time to PCM format.

To prevent degradations of the speech signal caused by tandemed connections of codecs (vocoders), a method called "bypass" was developed to eliminate the double decoding/encoding performed by vocoders in base stations during a call involving two wireless terminals.

The present invention provides a novel method and system for reducing the signal degradation that occurs when vocoders are connected in tandem during storage and retrieval of digitized voice signals. The system features mechanisms and protocols for determining the most suitable algorithm for compression/decompression of the voice signal in such situations.

Figure 2:
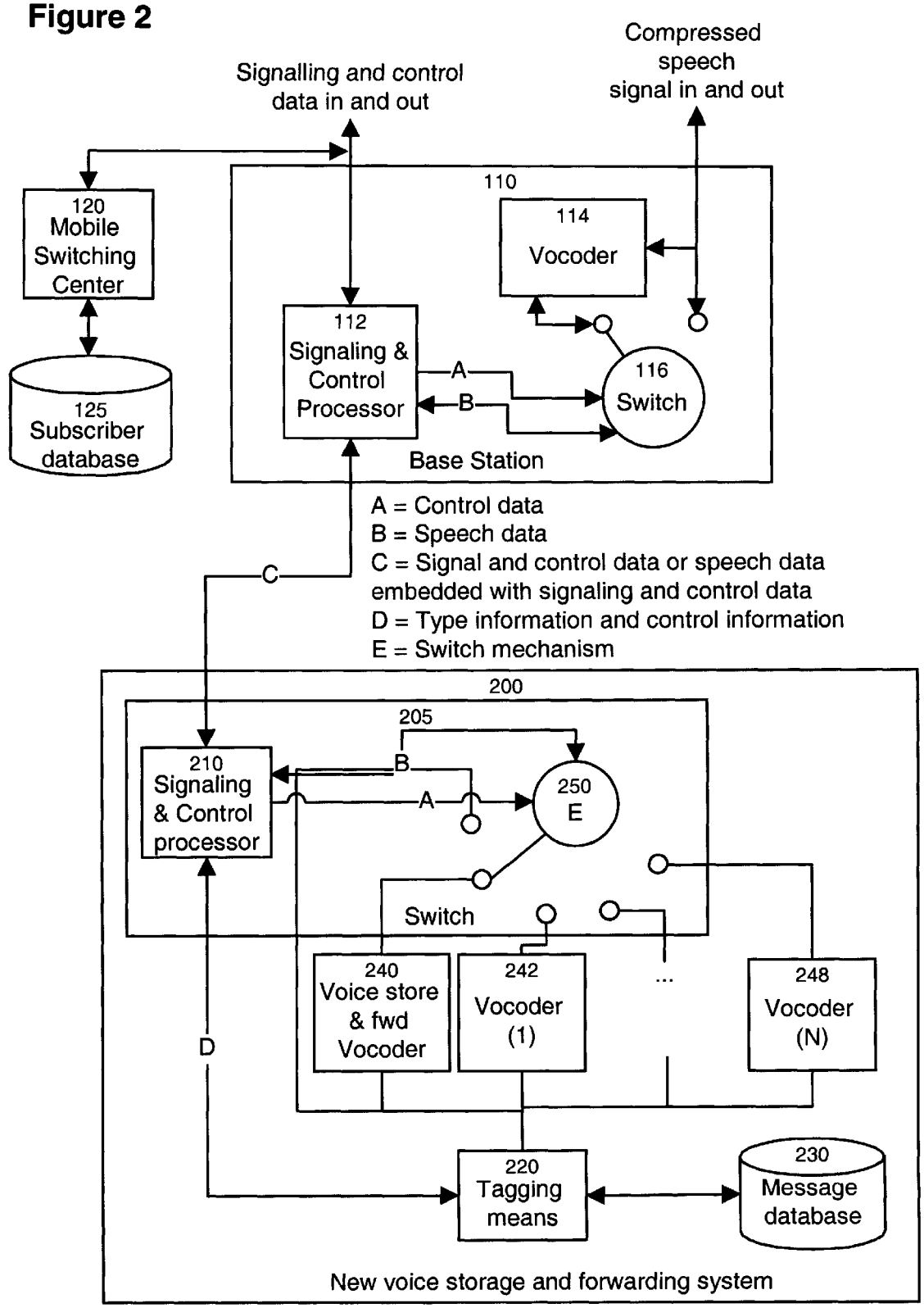
FIG. 2 is a block diagram of a system constructed in accordance with the present invention.

FIG. 2 shows a block diagram of a system constructed in accordance with the present invention. The following paragraphs describe the invention in a specific network setting. It is not the only network to which this invention applies and therefore should not be considered as limiting the scope of the invention. This invention applies to any voice store and forwarding device that uses a compressed form of speech. For example, it applies to Internet telephony.

FIG. 2 shows a base station 110, which is existing in the telecommunication network and that, in this case, has the "bypass" capability incorporated, and the new voice storage and forwarding device 200. The base station 110 has a signaling and control processor 112 to exchange signal and control information with other elements of the telecommunication network, a vocoder 114 to encode and decode speech frames and a switch 116 which, under the control of the signaling and control processor 112, enables the choice between the vocoding function and the "bypass" function.

The voice storage and forwarding device 200 has a switch 205, which includes a signaling and control processor 210 to exchange signal and control information with other elements of the telecommunication network and a switch mechanism 250 which, under the control of the signaling and control processor 210, enables the choice between one of the possible vocoding functions and the "bypass" function. The voice storage and forwarding device 200 further has a tagging means 220 that attaches a vocoder type designator that identifies the vocoder that last converted the speech frame, a message database 230 to store the compressed speech frames and a group of vocoders 240 to 248 to encode and decode speech frames in the first to $N^{th}$ format.

The reason for offering a choice of vocoders is to avoid the possibility of signal degradation in circumstances when a tandem connection is established. The degradation of the signal is less severe when identical, or at least compatible, vocoders effect the successive compression/decompression cycles, than if non-compatible vocoders types are used. Thus, normally, the "preferred vocoder" setting for a particular user should be the type of vocoder that is used in the wireless terminal from which the messages will be retrieved.

The following describe the signal flow in the Base station and voice storage and forwarding device combination.

Figure 3A:
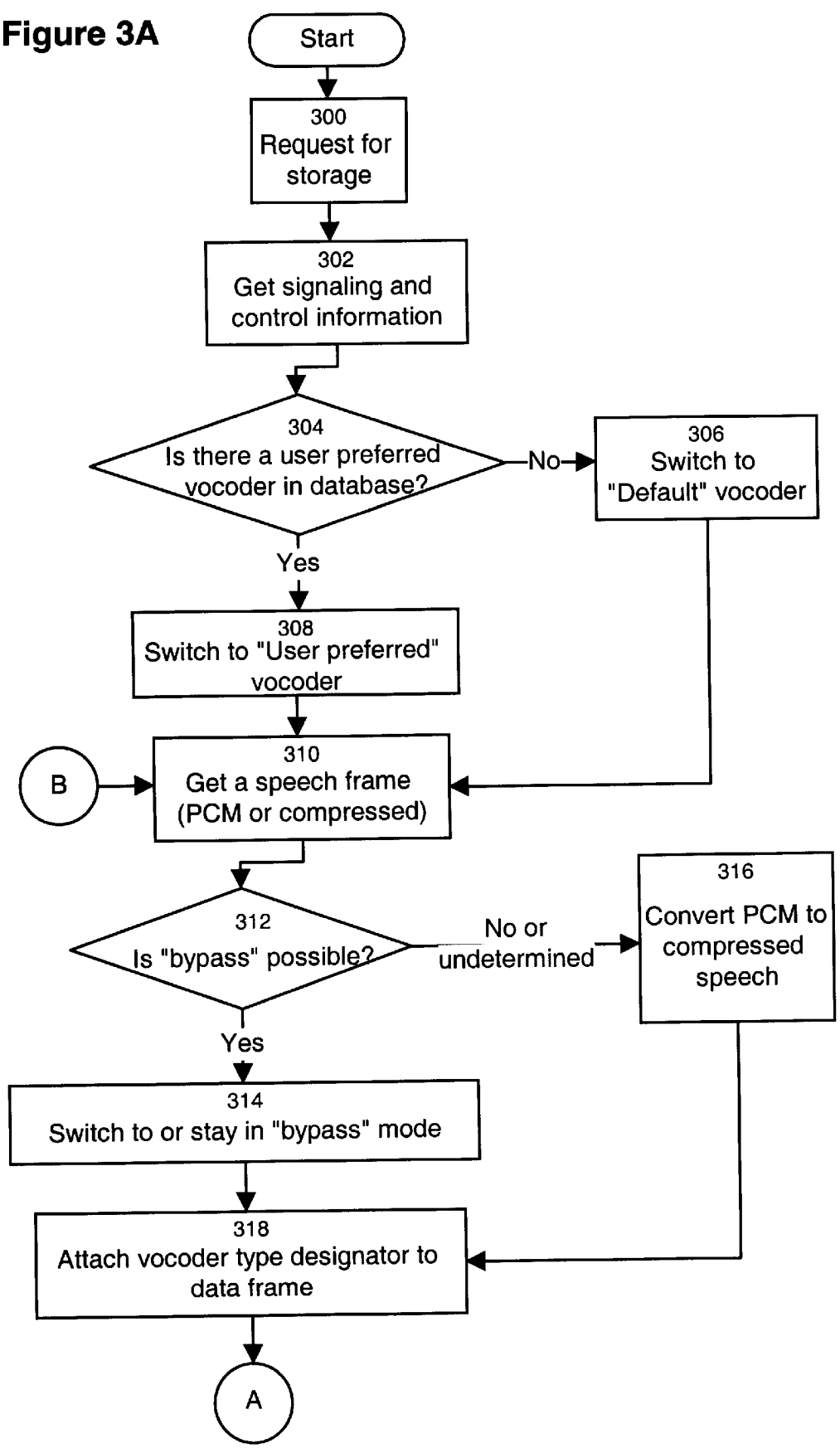
FIG. 3A and 3B represent a flow chart describing the procedure for storing a message in the voice storage and forwarding device in accordance with the invention.
Figure 3B:
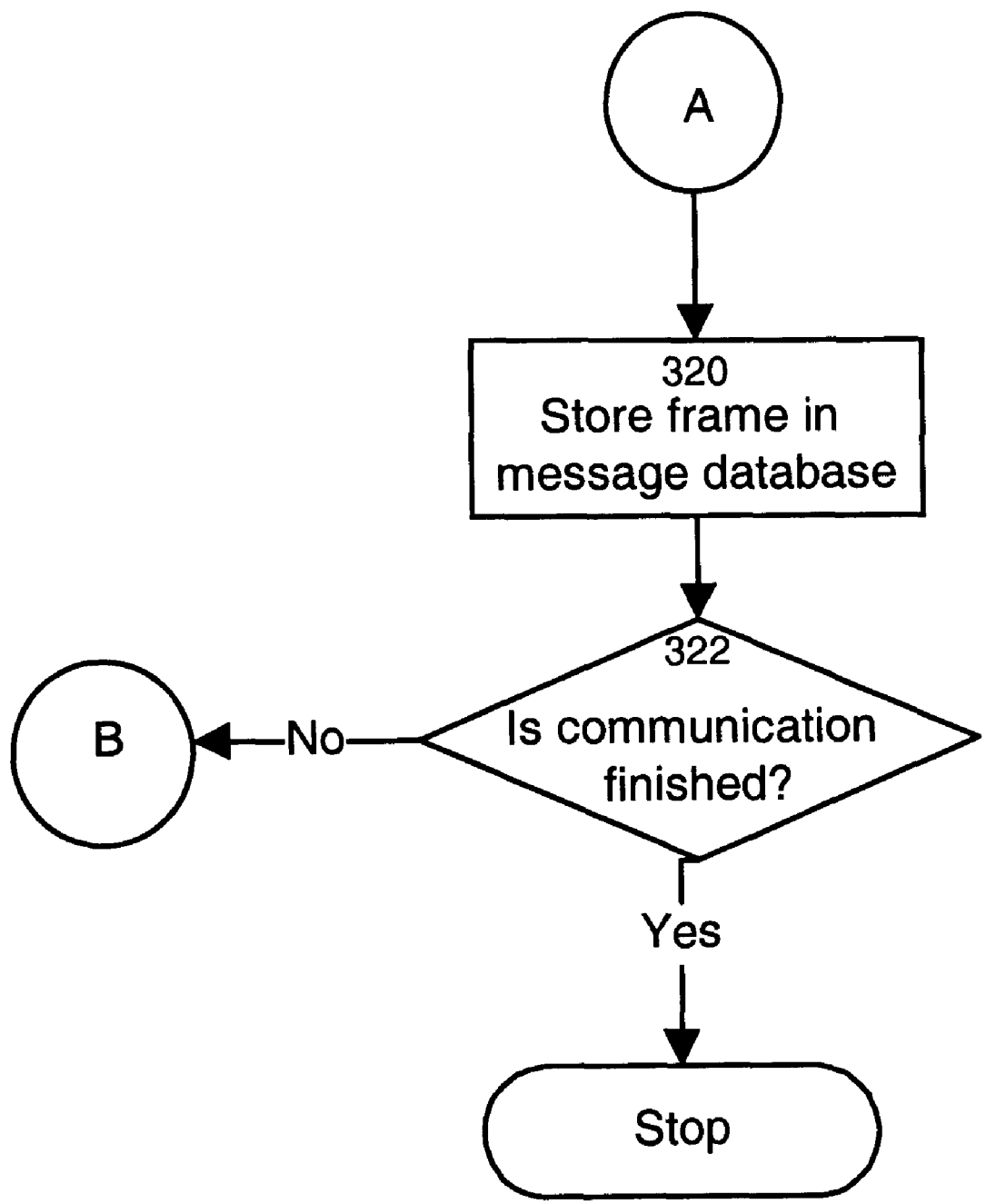

FIG. 3 is a flow chart describing the procedure, which is implemented by the voice storage and forwarding device 200 when a message is to be stored in the message database 230. A caller first makes a request for storage 300 (in fact, the system asks him if this is what he wishes to do) and then signaling and control information is exchanged 302 between all components involved in the call, namely the wireless terminal 100, the base station 110, the mobile switching center 120, and the voice storage and forwarding device 200. In the base station 110 this signaling and control information is handled by the signaling and control processor 112 and in the voice storage and forwarding device 200 it is handled by the signaling and control processor 210. These signaling and control processors interpret the signal and control data packets, which are sent to them under the control of mobile switching center 120 to find out if there is a user preferred vocoder from a database search operation 304. If it is determined that there is no user preferred vocoder 306, the signaling and control block 210 sends a signal to the switch mechanism 250 that will normally select the voicemail's own vocoder (default). If there is a user preference 308, the signaling and control block 210 sends a signal to inform the voice store and forwarding device and it will select the user-preferred vocoder 242 to 248, if it is available.

User preference is determined upon initialization of the mailbox by the voice storage and forwarding device subscriber. This information is stored in the subscriber database 125. This database could be organized as a table, where a vocoder identifier, which designates the "user preferred terminal" type, is stored for each user. When the transaction for message storage is initiated, the vocoder identifier corresponding to the specific mailbox is retrieved, along possibly with other data, from the database 125 and sent to the switch 200. The signaling and control processor 210 interprets the received control information and sets the switch mechanism 250 to the vocoder selection position that corresponds to the vocoder identifier received from the database. In a situation where, in the database 125 for a particular user, no vocoder identifier exists, the signaling and control processor can be set to adopt a default position, selecting a given vocoder that is normally the default vocoder.

Once the user preferred or default vocoder has been invoked, the system is ready to get a first speech frame 310. After the voice storage and forwarding device starts receiving speech frames, it will go through the "bypass" capability determination loop 312. This is done as described below.

The basic idea behind the "bypass" method is that base station 110, knowing through signaling and control, that the vocoder in wireless terminal 100 is identical with one of the vocoders in the voice storage and forwarding device 200, bypasses the vocoder by selecting the corresponding switch 116 position, thus allowing the signal data frames to pass directly in the digital network 115 without being altered. Similarly, the voice storage and forwarding device 200, knowing that it receives compressed speech data frames, simply transmits the signal to its message database 230, without any coding, by selecting 314 the corresponding switch mechanism 250 position.

For signaling and control, the process of bit stealing is used during PCM signal transmission. This process consists of utilizing certain bits from certain speech samples to transmit signaling information. The location of the signaling bits and the bit robbing rate are selected to reduce the perceptual effect of the bit substitution, such that the audible signal at either one of the wireless terminals is not significantly affected. The receiving vocoder knows the location of the signaling bits in the speech samples and it is thus capable of decoding the message.

More specifically, when in message storage mode, the handshaking procedure between the base station 110 and the voice storage and forwarding device 200 involves the exchange of different messages such that every unit can be set in a mode allowing to produce the best possible speech quality. The handshaking procedure involves the exchange of the following messages:

a) the signaling and control processor 112 embeds an identifier in the PCM speech signal issued by the vocoder 114. This identifier enables the new voice storage and forwarding device 200 to precisely determine the originating terminal and its capabilities. For example, it identifies the vocoder, namely the vocoder in the wireless terminal 100. The identification is effected by a database search operation, as it will be described hereafter.

b) the signaling and control processor 210 examines the data frames received from the signaling and control processor 112 and converted by the vocoder 114, and extracts any inband signaling information. This is effected by observing the bit values at the predetermined locations in the data frame. If the inband message is a vocoder identifier, a database (not shown in the drawings) is consulted to determine the type of vocoder issuing the message. Depending upon the contents of the message, the following possibilities arise:

1) if the signaling and control processor 210 has determined that the base station 110 is not "bypass" capable, or that it has not been able to determine it yet, or that the originating terminal simply is not equipped with a vocoder (i.e. it is a wireline terminal), it will leave the switch mechanism 250 in its position and convert PCM speech 316, received from the base station 110 or the PSTN 140, to compressed speech with one of the vocoders which has been chosen as described earlier ("user preferred" or "default");

2) if the signaling and control processor 210, has identified that the base station 110 is "bypass" capable, the identifier of the vocoder is verified in the local database to determine the originating vocoder type, namely the vocoder in the wireless terminal 100. If:

i) the voice storage and forwarding device 200 has an identical vocoder, in other words the vocoder in the wireless terminal 100 operates according to the same frame format or standard as one of the vocoders linked to the voice storage and forwarding device 200, the signaling and control processor 210 sends a message to the signaling and control processor 112 which causes both switches 116 and 250 to adopt the "bypass" position 314 at the same time. Thus, any compressed speech data received from the wireless terminal 100 will be directed to the message database 230 without decoding. This mode of operation is the one that allows achieving the best possible voice quality since no vocoder tandeming occurs; or ii) the voice storage and forwarding device 200 does not have an identical vocoder, then the signaling and control processor 210 will leave the switch mechanism 250 in its position and convert PCM speech 316, received from the base station 110, to compressed speech with one of the vocoders which has been chosen as described earlier ("user preferred" or "default").

Once the signaling and control processor 210 has determined the switch mechanism 250 selection, it will send a signal to the tagging means 220 that will instruct it to attach a vocoder type designator 318. This will be done for each data frame. The tagging means is any agency that is capable of generating an identification code, constituting a vocoder type designated that identifies the type of vocoder which was used to compress the speech signal. The compressed speech data frame can now be stored 320 in the message database 230.

The last step is to determine, through signaling and control, if the communication is finished 322. If the communication is not finished, the signaling and control processor 210 will get a new speech frames (PCM or compressed) and process it as described above.

Note that the description above was specific to in-band signaling for signaling and control information. The same description could be modified to include out-of-band signaling instead.

Figure 4:
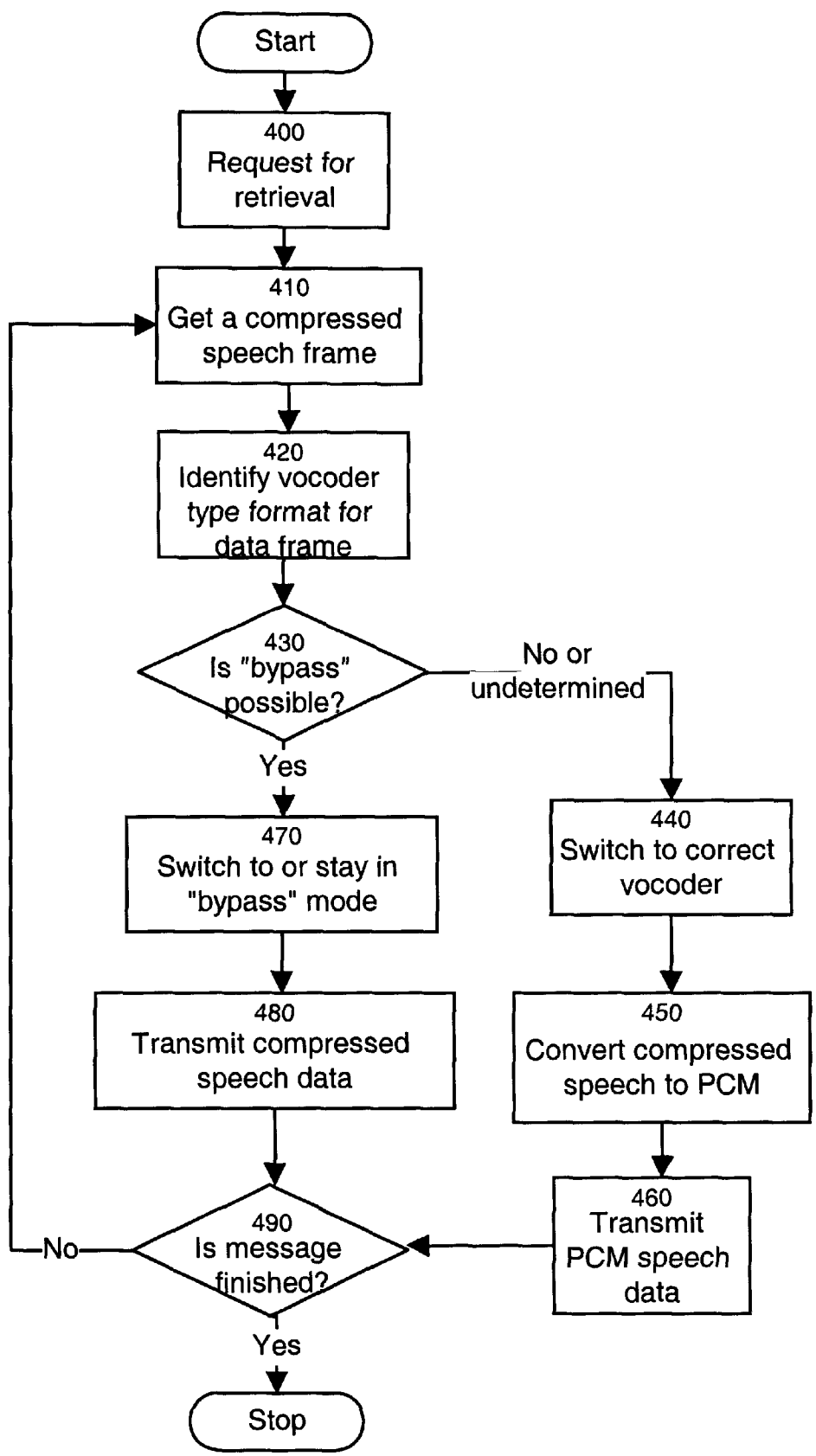
FIG. 4 is a flow chart describing the procedure for retrieving a message from the voice storage and forwarding device in accordance with the invention.

FIG. 4 is a flow chart describing the procedure that is followed by the voice storage and forwarding device 200 when a message is to be retrieved from the message database 230.

A caller first makes a request for retrieval 400 by accessing the voice storage and forwarding device 200 via a remote terminal (wireless 100 or wireline 150). The signaling and control processors 112 and 210 exchange the necessary information in order to get a first compressed speech frame 410 from the message database 230.

The voice storage and forwarding device 200 will identify, through the tagging means 220, the vocoder type format for the speech frame 420. It will then go through the "bypass" capability determination loop 430.For the first few frames, the system will not be ready to use the "bypass"

mode since the inband communication channel will not have been established yet. "Bypass" not being possible, the tagging means 220 that first receives the data frame from the message database, will extract the vocoders type designated data associated with the data frame, and issue a signal to the signaling and control processor 210 to set 440 the switch mechanism 250 to the vocoder selection position identified by the vocoder type designator such that the compressed speech frame may be converted to PCM 450 with the one of the vocoder 240 to 248. The PCM data will then be transmitted 460 to the base station 110.

For the frames following the first few, it may be determined (as described in detail below) that "bypass" is possible. A signal will be issued to the signaling and control processor 210 to set 470 the switch mechanism 250 to the "bypass" position such that any compressed speech data retrieved from the message database 230 will be directed to the retrieving wireless terminal 100 without decompression 480. This mode of operation is the one that allows achieving the best possible voice quality since no vocoder tandeming occurs.

For the "bypass" capability determination when in message retrieval mode, the handshaking procedure between the voice storage and forwarding device 200 and the base station 110 involves the exchange of different messages such that every unit can be set in a mode allowing to produce the best possible speech quality. The handshaking procedure involves the exchange of the following messages:

a) the signaling and control processor 210 embeds an identifier in the PCM speech signal issued by one of its vocoders 240 to 248. This identifier enables any base station 110 to precisely determine the compressed speech format in which the data was stored. The identification is effected by a database seeking operation, as it will be described hereafter.

b) if a wireline terminal is retrieving the message, there will be no handshaking procedure since the speech data will not pass through a base station. The voice storage and forwarding device 200 will simply convert 450 the compressed speech data from its message database 230, using the proper vocoder 240 to 248, and send 460 the PCM speech data to the wireline terminal 150 through the PSTN 140;

c) if the message is being retrieved by a wireless terminal and base station 110 is not "bypass" capable, the signaling and control data which was attached to the speech data will simply be ignored and there will be no handshaking procedure. The voice storage and forwarding device 200 will continue the retrieval of data frames and their conversion 450, in the proper vocoder 240 to 248, from compressed speech data to PCM speech data and the vocoder 114 of base station 110 will then be used to convert PCM speech data to compressed speech data; or d) if the message is being retrieved by a wireless terminal 100 and base station 110 is "bypass" capable, the signaling and control processor 112 examines the data frames received from the signaling and control processor 210, and converted by one of the vocoders 240 to 248, and extracts any inband signaling information. This is effected by observing the bit values at the predetermined locations in the data frame. If the inband message is a vocoder identifier, a database (not shown in the drawings) is consulted to determine the type of vocoder connected to the vocoder issuing the message. Depending upon the contents of the message, the following possibilities arise:

1) if the wireless terminal 100 retrieving the message has an identical vocoder, in other words the vocoder in the wireless terminal 100 operates according to the same frame format or standard as the one for the vocoder which was used to store the data in the message database 230, the signaling and control processor 112 sends a message to the signaling and control processor 210 which causes both switches 250 and 116 to adopt the "bypass" position at the same time 470. Thus, any compressed speech data retrieved from the message database 230 will be directed to the retrieving wireless terminal 100 without decompression 480. This mode of operation is the one that allows achieving the best possible voice quality since no vocoder tandeming occurs; or 2) if the wireless terminal 100 retrieving the message does not have an identical vocoder, then the signaling and control processor 112 will leave the switch 116 in its position and convert PCM speech received from the voice storage and forwarding device 200 to compressed speech with its own vocoder and switch mechanism 250 will also be left in the position which the tagging means 220 has determined 420 and it will convert compressed speech to PCM 450 using one of its vocoders.

The last step of the message retrieval procedure is to determine if the message is finished 490. If the message is not finished, the signaling and control processor 210 will get a new speech frames 400 (PCM or compressed) and process it as described above.

Figure 5:
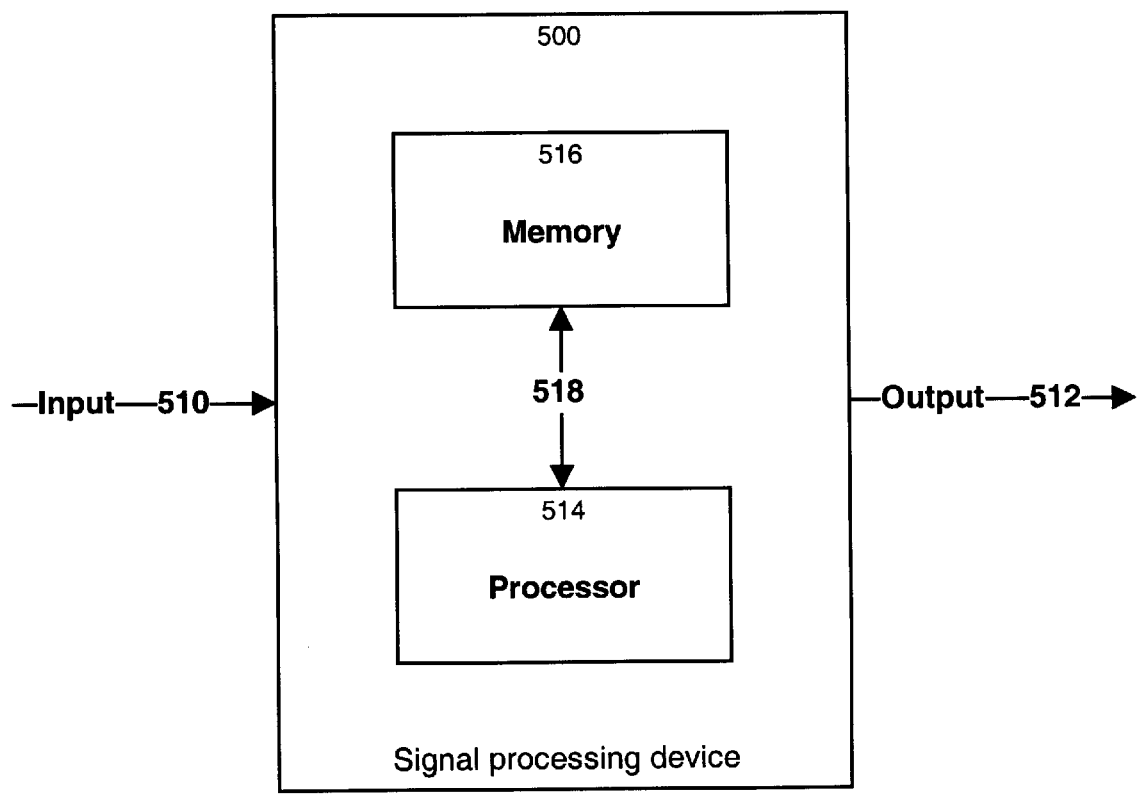
FIG. 5 illustrates an apparatus that can be used to implement the function of the new voice storage and forwarding device.

From a structural point of view, the apparatus illustrated at FIG. 5 can be used to implement the function of the new voice storage and forwarding device 200 whose operation was detailed above in connection with FIGS. 3 and 4. The apparatus comprises an input signal line 510, a signal output line 512, a processor 514 and a memory 516. The memory 516 is used for storing instructions for the operation of the processor 514 and also for storing the data used by the processor 514 in executing those instructions. A bus 518 is provided for the exchange of information between the memory 516 and the processor 514.

The instructions stored in the memory 516 allow the apparatus to operate according to block 200 of the functional block diagram illustrated at FIG. 2.

Figure 6:
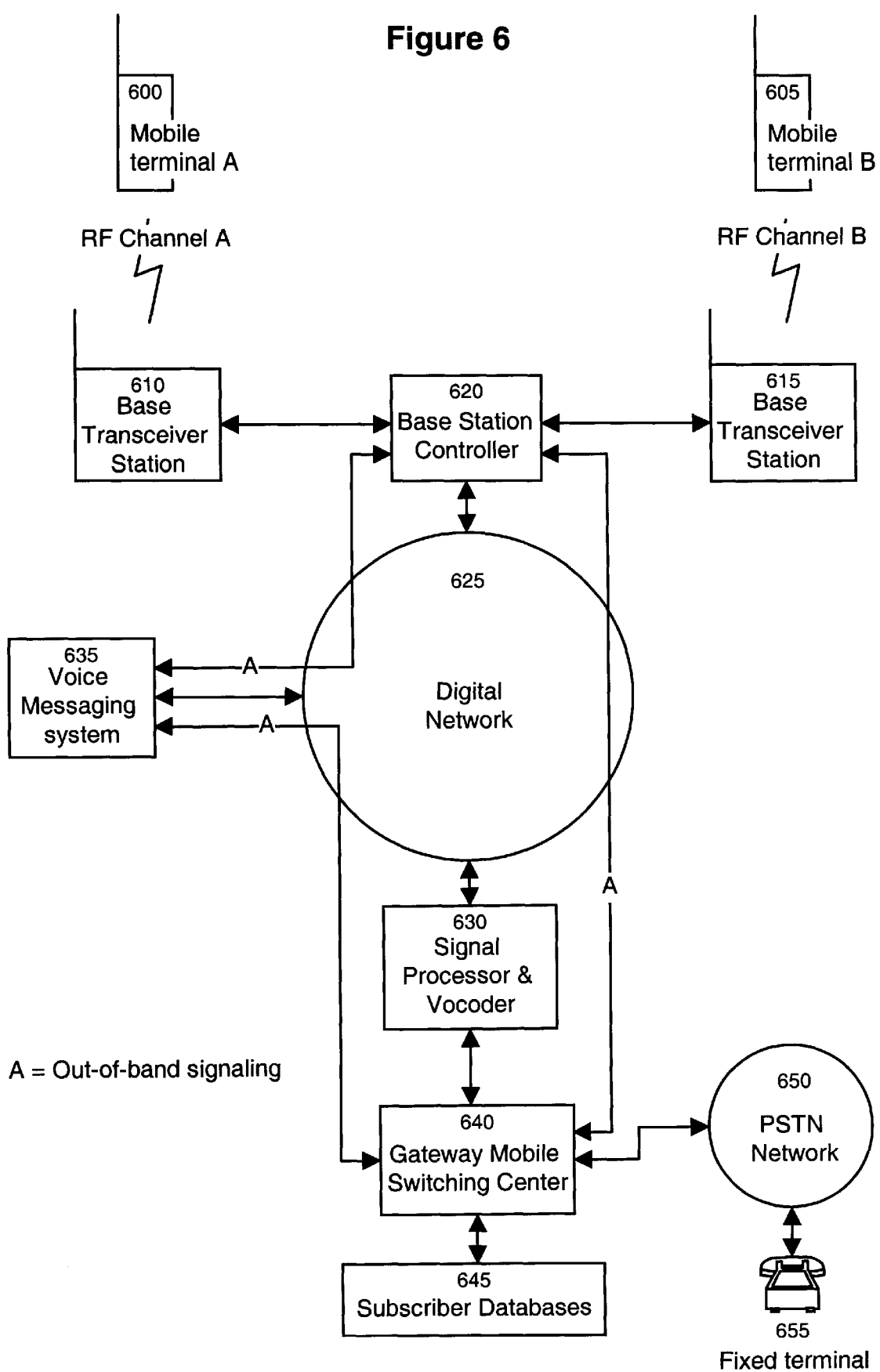
FIG. 6 is a voice storage and forwarding system according to the invention in which the voice storage and the voice processing are physically separate.

An alternative to the voice storage and forwarding system described in FIG. 2 would be to physically separate the storage means and the speech processing (vocoders) means as shown in FIG. 6. In this case, the signal processor and vocoder 630 is located at the gateway to the low bit-rate communication network. In this particular example, the gateway is the gateway mobile switching center 640. The signal processor and vocoder 630 is responsible for automatic gain control of the voice, for silence deletion and for low-bit rate coding of speech. Another specific characteristic of this network arrangement is that out-of-band signaling is used between the base station controller 620 and the gateway mobile switching center 640, between the voice messaging system 635 and the base station controller 620 and, finally, between the gateway mobile switching center 640 and the voice messaging system 635. In general, out-of-band signaling is used between all elements of the network.

Figure 7:
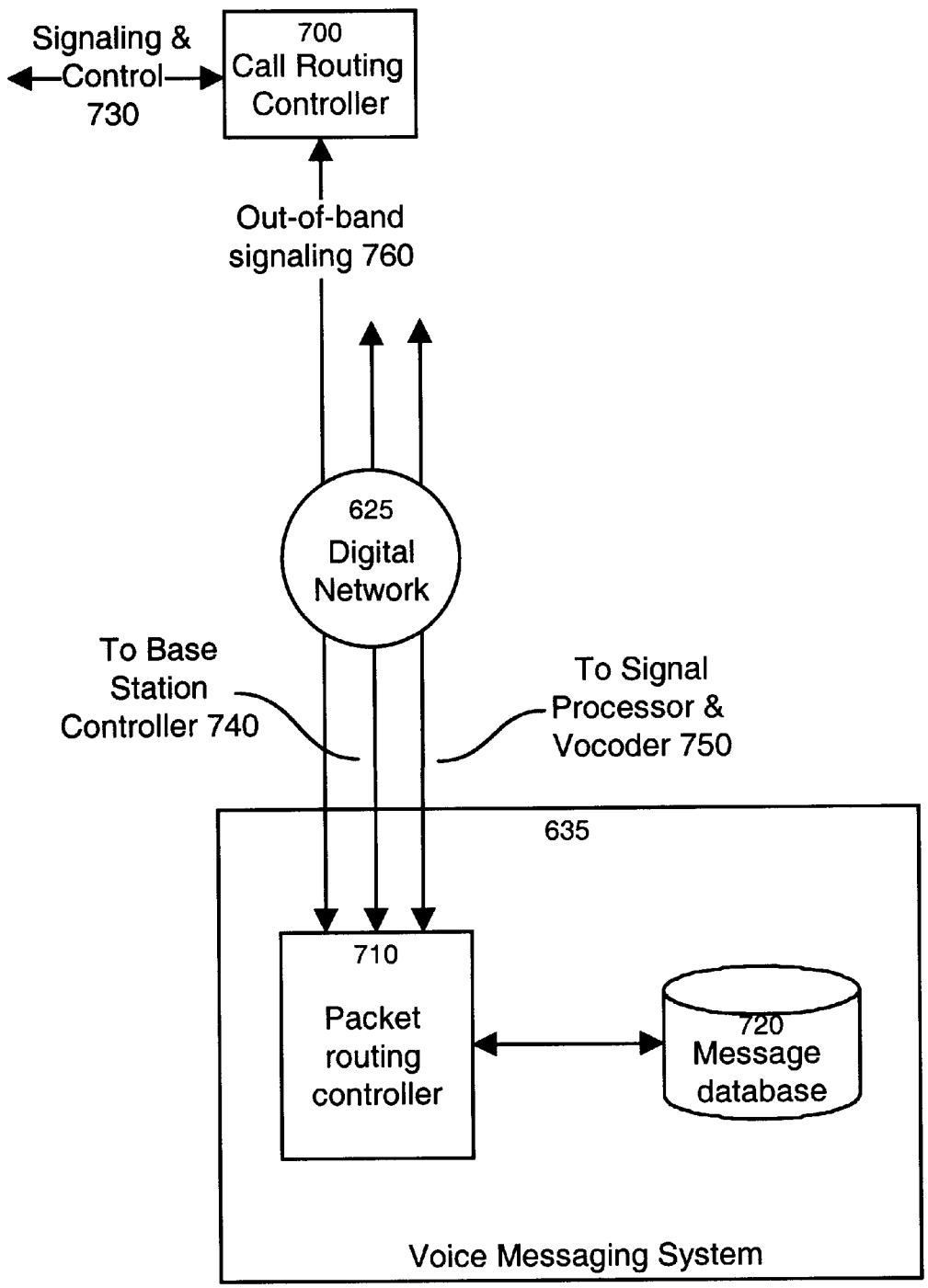
FIG. 7 is a block diagram giving further details of the system depicted in FIG. 6.

FIG. 7 is a block diagram giving further details of the system depicted in FIG. 6. In this Figure, a call routing controller 700 is shown, which, in a specific example, would be co-located in the gateway mobile switching center 640. It could also be located elsewhere in the network. The function of the call routing controller 700 is to receive and send signaling and control information 730 from the element in the network initiating and setting-up the call and to send and receive out-of-band signaling information 760 to the data frame routing controller 710 of the voice messaging system 635. The data frame routing controller 710 receiving this out-of-band signaling information 760 determines to which component of the network it will be forwarding data frames retrieved from the message database 720. The component can either be the base station controller 740 or the signal processor and vocoder 750. Note that the routing of the data frames from the voice messaging system 635 is always performed through the Digital Network 625 in compressed form.

The following paragraphs illustrate two specific examples of the operation of the system depicted in FIGS. 6 and 7.

A call is setup from a subscriber (fixed terminal 655) in the PSTN to mobile terminal 600. The call is routed by the PSTN 650 to the gateway mobile switching center 640. The mobile switching center 640 interrogates the subscriber database 645 (i.e. home location register, visitor location register, equipment identity register, etc.) to determine the location of the mobile terminal 600 and the disposition of the call. The subscriber databases 645 also provide information on the capabilities of the subscriber mobile terminal equipment 600 (e.g. the vocoding algorithms supported and the user preferred vocoder). Assuming the call is to be routed to a voice messaging system 635, the call routing controller 700 receives signal and control information and sends out-of-band signaling information to the data frame routing controller 710 advising it that it will be receiving data frames from the signal processor and vocoder 630, A speech vocoding algorithm is then selected, this information is provided to the signal processor and vocoder 630, and the low-bit rate encoded speech is routed to the voice messaging system 635 via the Digital Network 625. In one specific example, the selection of speech vocoding algorithms can be implemented by providing in the functional block 630 a plurality of vocoders and a switch, as depicted in FIG. 2, to selectively activate one of the vocoders that corresponds to the desired vocoding algorithm.

In a first message retrieval scenario the subscriber to which the message is addressed wishes to retrieve the voice mail message using his mobile terminal 600. The routing controller 700 receives this signaling information, and on the basis of this information indicating that the recipient is a mobile terminal, i.e., provided with a vocoder, concludes that the recorded message should be directed to the terminal for local decompression, rather than being directed to the vocoder 630. The call routing controller 700 then issues an out-of-band signal to the data frame routing controller 710 advising it that it will be sending information to the base station controller 620 rather than to the vocoder 630. The low-bit rate speech is then retrieved from the message database 720 and routed directly to the base station controller 620 via the Digital Network 625 and ultimately to the mobile terminal 600.

In another message retrieval scenario, the subscriber to whom the message is addressed retrieves the voice mail message using a fixed terminal 645 in the PSTN 650. In this case, the call routing controller 700 receives signaling information and sends an out-of-band signal to the data frame routing controller 710 advising it that it will be sending information through its output to the signal processor and vocoder 630 via the Digital Network 625. The voice message is then retrieved from the message database 720, routed to the signal processor and vocoder 630 (via the Digital Network 625), re-coded to PCM, and finally routed through the mobile switching center 640 and the PSTN 650, to the fixed terminal 655.

In another message recording scenario, a subscriber using mobile terminal A 600 is trying to reach a second subscriber using the wireless network, i.e., mobile terminal B 605. Again, wireless network signaling is used to interrogate the subscriber databases 645 in order to determine the location of each subscriber and the disposition of the call. Assuming the call is to be routed to a voice messaging system 635, the routing controller 700 receives signal and control information, and knowing the vocoding capabilities of each mobile terminal, will determine the best vocoding algorithm to use. As mentioned earlier, the selection of a particular vocoding algorithm can be effected by activating a particular vocoder in a bank of vocoders. In the case where the vocoders are completely compatible, the speech signal will be sent directly from the base station controller 620 to the voice messaging system 635 via the digital network 625. In other cases, a vocoding algorithm needs to be determined, which will minimize the degradation of the speech signal, and the speech signal will be sent from the base station controller 620 to the signal processor and vocoder 630 and, finally to the voice messaging system 635. These components (630 and 635) could be located elsewhere in the network. In all cases, the call routing controller 700 will send out-of-band signaling information to the data frame routing controller 710 advising it where it will be receiving data frames from.

In the type of arrangement described in FIGS. 6 and 7, the vocoder tandeming issue would be avoided and another advantage would be to save on costs by reducing the number of vocoders required. For instance, the network can be provided with a plurality of voice messaging systems 635 serviced by a single vocoder 630. This type of system is not limited to wireless applications. It is applicable to any network which use speech in a compressed form. For example, it is also applicable to Internet telephony and to corporate low bit-rate communication network. An example of an Internet telephony voice messaging system network arrangement is given in FIG. 8. Furthermore, an example of a corporate low bit-rate communication network arrangement is given in FIG. 9.

Figure 8:
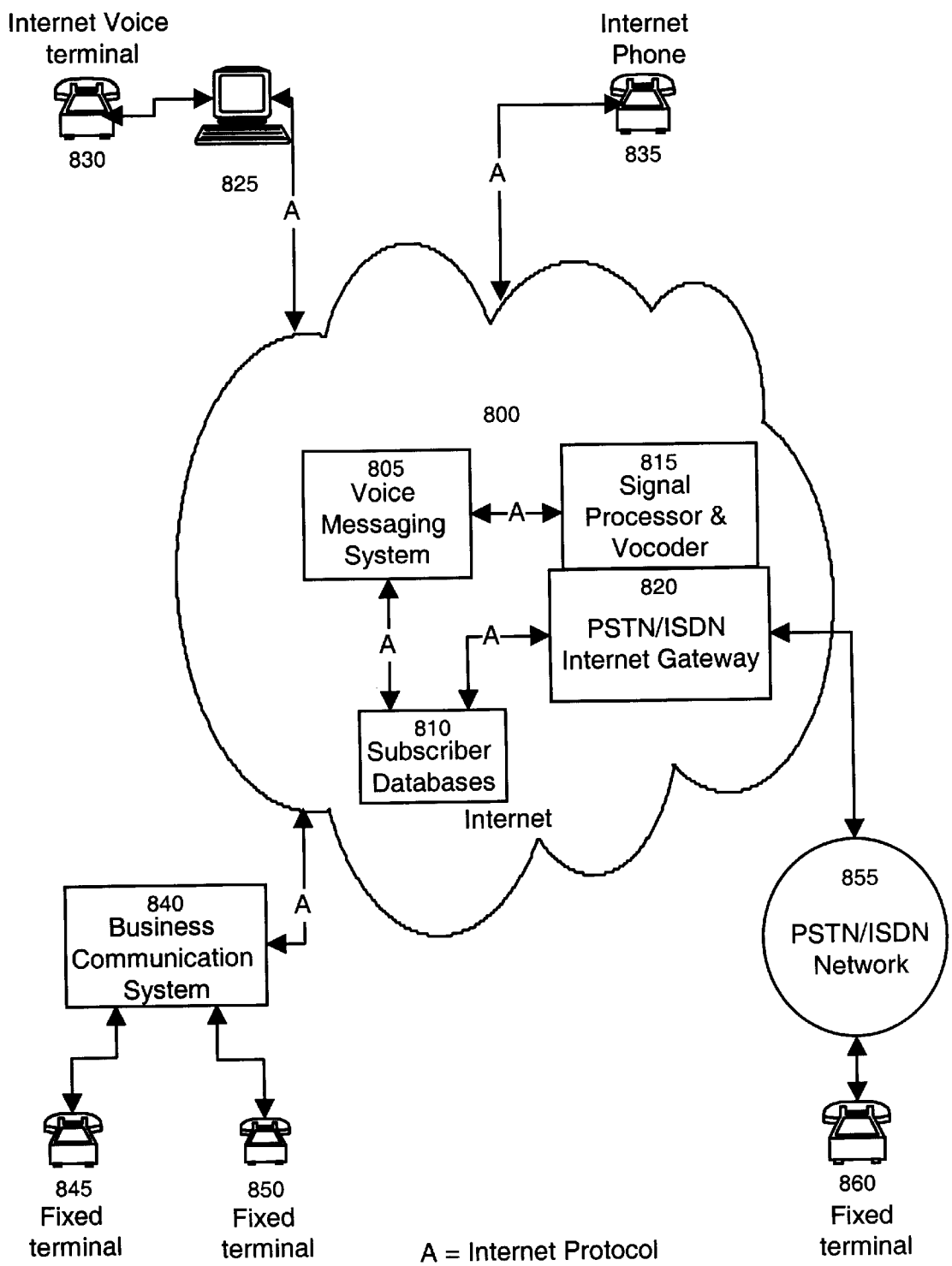
FIG. 8 illustrates a voice messaging system where the signal processor, vocoder, the subscriber databases and the PSTN/ISDN Internet Gateway are part of the Internet.

In FIG. 8, the voice messaging system 805, the signal processor and vocoder 815, the subscriber data bases 810 and the PSTN/ISDN Internet Gateway 820 are included in the Internet 800. These components communicate between them using the Internet protocol. The PSTN/ISDN Internet Gateway 820 is connected to the PSTN/ISDN network 855, which in turn is connected to fixed terminals such as 860. Examples of terminals used for telephony with the Internet 800 are: an Internet phone 835, an Internet voice terminal 830 that is connected through a computer terminal 825, and fixed terminals 845 and 850 that are connected via a business communication system 840.

Figure 9:
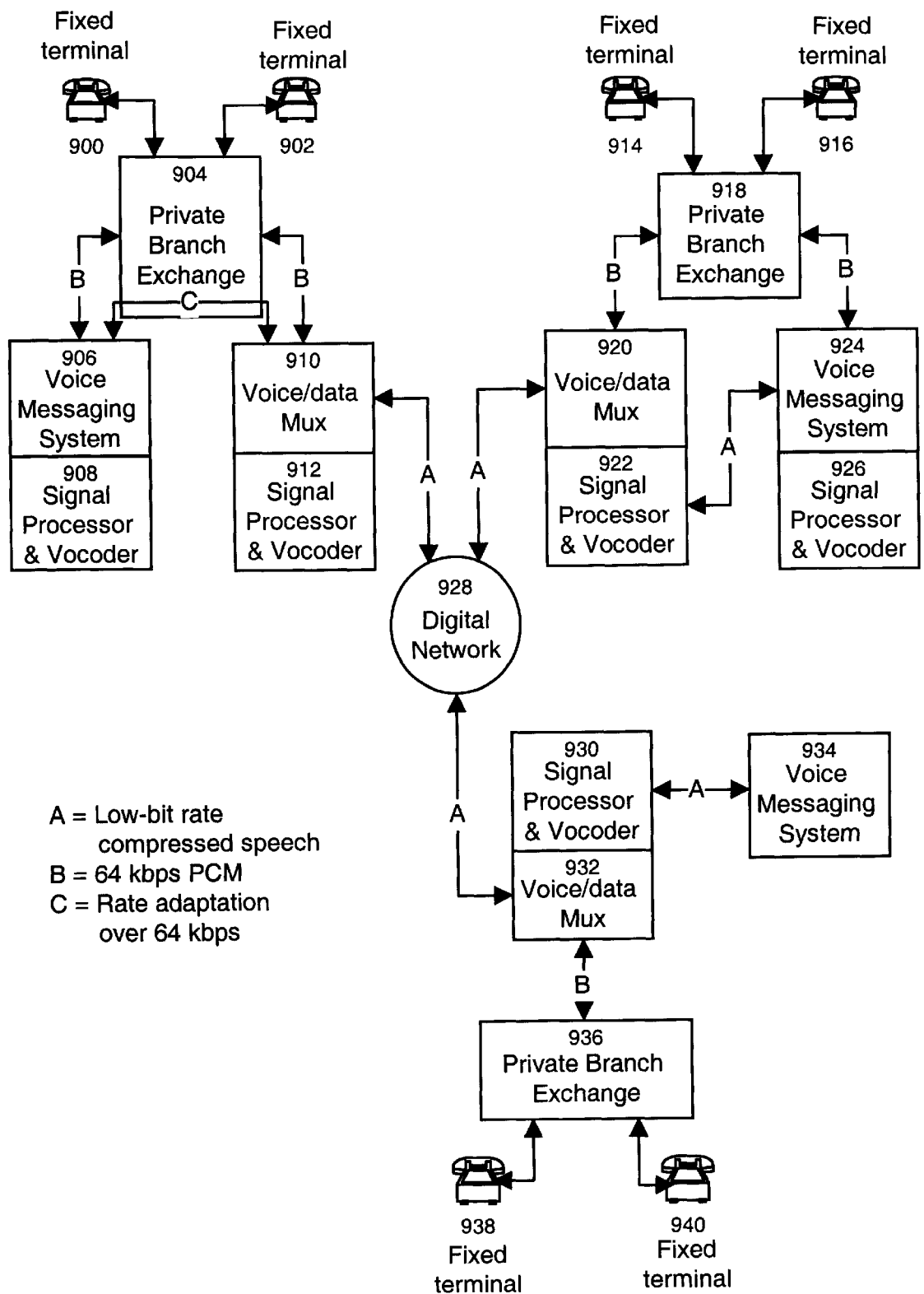
FIG. 9 illustrates a plurality of branch exchanges connected to one another through a digital network.

In FIG. 9, all fixed terminals 900, 902, 914, 916, 938, and 940 are connected to private branch exchanges such as 904, 918 and 936. These private branch exchanges are connected together through a digital network 928 via voice/data multiplexers such as 910, 920 and 932. At each private branch exchange, an example of an embodiment of the voice messaging system is given. With private branch exchange 904, a signal processor and vocoder 908 is co-located with the voice messaging system 906 that communicates with the private branch exchange 904 in 64 kbps PCM formats and that also communicates with the voice/data multiplexer 910 through the private branch exchange 904 in a rate adapted format over 64 kbps. Yet another signal processor and vocoder 912 is co-located with the voice/data multiplexer 910. With private branch exchange 918, a signal processor and vocoder 926 is also co-located with the voice messaging system 924 that communicates with the private branch exchange 918 in a 64 kbps PCM format as well as another signal processor and vocoder 922 in low-bit rate compressed speech format. The signal processor and vocoder 922 is co-located with the voice/data multiplex term 920 that communicates with the private branch exchange 918 in a 64 kbps PCM format. The embodiment shown with private branch exchange 936 shows the voice messaging system 934 communicating in low-bit rate compressed speech format with the signal processor and vocoder 930 that is co-located with the voice/data multiplexer 932 that, in turn, communicates with the private branch exchange in 64 kbps PCM format.

The above description of a preferred embodiment should not be interpreted in any limiting manner since variations and refinements can be made without departing from the spirit of the invention. The scope of the invention is defined in the appended claims and their equivalents.

We claim:

1. A voice storage and forwarding device for use in a communication network, comprising:

an audio signal encoder;

a storage medium in a data communicative relationship with said audio signal encoder, said storage medium capable to store data frames of a signal that conveys audio information issued by said audio signal encoder during a message recording transaction;

an audio signal decoder;

a first data pathway connected to said storage medium for transporting data frames in compressed form from said storage medium toward a first termination point of the communication network at which a subscriber terminal connected to the communication network may potentially effect a message retrieval transaction;

a second data pathway for transporting data frames toward said audio signal decoder, said audio signal decoder being in a data communicative relationship with a second termination point of the communication network at which a subscriber terminal connected to the communication network may potentially effect a message retrieval transaction; and controlling means operative to select either one of said first and second data pathways for delivery of data frames from said storage medium during a given message retrieval transaction in dependence of the termination point of the communication network at which the subscriber terminal, with which said given message retrieval transaction is effected, is connected.

2. A voice storage and forwarding device as defined in claim 1, wherein said first termination point is part of a cellular network.

3. A voice storage and forwarding device as defined in claim 2, wherein said second termination point is part of a Public Switched Telephone Network (PSTN).

4. A voice storage and forwarding device as defined in claim 3, comprising a vocoder that combines said audio signal decoder and said audio signal encoder.

5. A voice storage and forwarding device as defined in claim 4, comprising a data frame routing controller responsive to commands issued by said controlling means to direct data frames from said storage device toward either one of said first and second data pathways.

6. A voice storage and forwarding device as defined in claim 5, including an out-of-band signaling link between said controlling means and said data frame routing controller.

7. A voice storage and forwarding device as defined in claim 6, wherein said controlling means is remote from said data frame routing controller.

8. A voice storage and forwarding device as defined in claim 7, wherein said controlling means is part of a gateway mobile switching center.

9. A voice storage and forwarding device as defined in claim 4, wherein said vocoder is part of a gateway mobile switching center.

10. A voice storage and forwarding device as defined in claim 2, wherein said first data pathway permits transport of data frames in encoded format without decoding.

11. A communication system, comprising:

a cellular communication network including at least one base station, said base station capable of establishing a data transmission link with a mobile terminal;

a Public Switched Telephone Network (PSTN), an interface between said cellular communication network and said PSTN network; and a voice storage and forwarding device, including:

a) a storage medium capable of storing data frames of an encoded audio signal issued by an audio signal encoder during a message recording transaction;

b) a first data pathway permitting transport of data frames of an encoded audio signal from said storage device toward said cellular network;

c) a second data pathway permitting transport of data frames of an encoded audio signal from said storage device toward said PSTN network;

d) an audio signal decoder in said second data pathway for decoding the data frames issued by said storage device; and e) a data frame routing controller for directing data frames from said storage device toward a selected one of said first and second data pathways in dependence as to whether a subscriber terminal effecting a message retrieval transaction with said voice storage and forwarding device is connected to said cellular network or said PSTN network.

12. A communication system as defined in claim 11, wherein said second data pathway passes through a gateway mobile switching center.

13. A communication system as defined in claim 12, wherein said audio signal decoder is located in said gateway mobile switching center.

14. A communication system as defined in claim 13, wherein said gateway mobile switching center includes an audio signal encoder for processing an audio signal to generate encoded data frames for storage on said storage means.

15. A communication system as defined in claim 14, including an out-of-band signaling link between said gateway mobile switching center and said data frame routing controller to command said data frame routing controller to direct data frames toward a selected one of said data pathways.

16. A method for storing and forwarding audio information, comprising the steps of:

providing a storage medium capable of storing data frames of an encoded audio signal tssued by an audio signal encoder during a message recording transaction; and during a message retrieval transaction performing either one of the following steps:

a) delivering data frames to a subscriber terminal without decoding if the subscriber terminal has a data frame decoding capability; and b) delivering data frames toward a subscriber terminal without data frame decoding capability and decoding the data frames at a point intermediate between said storage medium and the subscriber terminal without data frame decoding capability.

17. A voice storage and forwarding device for use in a communication network, comprising:
   a) a storage medium capable to store data frames of a signal in compressed format, the signal conveying audio information issued during a message recording transaction;
   b) a data frame routing controller coupled to said storage medium to route data frames from said storage medium toward a selected destination during a message retrieval transaction, said data frame routing controller being responsive to out-of-band signaling to:
      i) direct data frames from said storage medium toward a first pathway leading to a subscriber terminal at which the given message retrieval transaction is effected, the first pathway including a decoder remote from the subscriber terminal to convert the data frames into a decompressed format, when the out-of-band signaling is indicative that the subscriber terminal lacks a capability to locally decompress the data frames;
      ii) direct data frames from said storage medium toward a second pathway leading to a subscriber terminal at which the given message retrieval transaction is effected, the second pathway delivering data frames in a compressed format to the subscriber terminal connected to the second pathway, when the out-of-band signaling is indicative that the subscriber terminal is capable to locally decompress the data frames.

* * * * *